United States Patent
Boisseau et al.

(12) 
(10) Patent No.: US 6,391,390 B1
(45) Date of Patent: May 21, 2002

(54) CURABLE COATING COMPOSITION WITH IMPROVED DURABILITY

(75) Inventors: John E. Boisseau, Bloomfield Hills; Donald L. St. Aubin, Commerce Township; Walter H Ohrbom, Hartland Township, all of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/532,763

(22) Filed: Mar. 22, 2000

(51) Int. Cl.⁷ .................... C09D 133/04; C09D 167/00; C09D 175/04
(52) U.S. Cl. .................... 427/385.5; 427/386; 427/387; 525/108; 525/110; 525/111; 525/117; 525/123; 525/124; 525/125; 525/131; 525/133; 525/142; 525/155; 525/161
(58) Field of Search ................................. 525/155, 108, 525/110, 111, 117, 123, 124, 125, 131, 133, 142, 161; 427/385.5, 386, 387

(56) References Cited

U.S. PATENT DOCUMENTS

| | | | |
|---|---|---|---|
| 4,504,628 A | 3/1985 | Johnson | 525/278 |
| RE34,791 E * | 11/1994 | Kazmierzak | 525/142 |
| 5,556,669 A | 9/1996 | Sasaki et al. | 427/410 |
| 5,639,828 A | 6/1997 | Briggs et al. | 525/208 |
| 5,872,165 A | 2/1999 | Oberg et al. | 524/100 |

FOREIGN PATENT DOCUMENTS

WO    WO 98/27146    * 6/1998

OTHER PUBLICATIONS

Peter A. Callais et al., "Synthesis of Acrylic HSC Resins with Peroxides Containing Hindered Amine Light Stabilizers," Modern Paint and Coatings, Sep. 1988, pp. 41 to 47.

* cited by examiner

Primary Examiner—Patricia A. Short
(74) Attorney, Agent, or Firm—Anna M. Budde

(57) ABSTRACT

The present invention provides a curable coating composition that includes a film-forming polymer, a polymeric additive having at least one bound surface protecting group, and a crosslinker that is reactive with the film-forming polymer. The polymeric additive is substantially free of groups reactive with the crosslinker and has comonomer units with aryl groups, alkyl groups having, on average, four or more carbon atoms, or combinations of the aryl and alkyl groups. When the coating composition is cured to form a cured coating layer, the concentration of the polymeric additive in the upper about 50% of the cured coating layer thickness is at least about 10% higher than the concentration of the polymeric additive in the rest of the cured coating layer.

27 Claims, No Drawings

CURABLE COATING COMPOSITION WITH IMPROVED DURABILITY

FIELD OF THE INVENTION

This invention concerns curable coating compositions, especially compositions for topcoats, particularly for clearcoats of color-plus-clear composite coatings.

BACKGROUND OF THE INVENTION

Curable, or thermosettable, coating compositions are widely used in the coatings art, particularly for topcoats in the automotive and industrial coatings industry. Color-plus-clear composite coatings provide topcoats with exceptional gloss, depth of color, distinctness of image, and special metallic effects. The automotive industry has made extensive use of these coatings for automotive body panels.

A topcoat coating should be durable to maintain its appearance and provide protection under service conditions during the lifetime of the coated article. Topcoat coatings for automotive vehicles, for example, are typically exposed to all kinds of weather, ultraviolet rays from the sun, abrasions from gravel thrown up during driving or from items set on the car when parked, and other conditions that can degrade the coating. A variety of additives can be added to a coating formulation to prevent or retard degradation, such as UV-light absorbers, hindered amine light stabilizers, anti-marring or slip additives, and antioxidants.

Because some additives tend to be removed from the coating over a period of time, due to leaching, volatilization, or other actions, techniques have been developed to covalently bond hindered amine light stabilizers and other ultraviolet light absorbers to the polymer binder of the coating composition so that the additive is covalently attached to the polymer network of the cured coating and cannot volatilize or be leached from the coating. These techniques are described in the article Peter A. Callais et al., "Synthesis of Acrylic HSC Resins with Peroxides Containing Hindered Amine Light Stabilizers," *Modern Paint and Coatings*, September 1988, pages 41 to 47, in Oberg et al., U.S. Pat. No. 5,872,165, and in Johnson, U.S. Patent No. 4,504,628, each of which are incorporated herein by reference. In the Callais article, a hindered amine light stabilizer is attached to an acrylic polymer by preparing the acrylic polymer using a peroxide having a hindered amine light stabilizer substituent. The acrylic resin with attached hindered amine light stabilizer is combined with a melamine crosslinker resin, a catalyst, and solvent to provide a clearcoat composition. In the Oberg patent, a benzotriazole or triazine ultraviolet light absorber is covalently bound to a polymer such as an acrylic polymer. The polymer is combined with a crosslinker, catalyst, and other additives to prepare a coating composition. In the '628 patent, a UV stabilizer is reacted onto a methacrylate monomer that is then addition polymerized to form an acrylic polymer having UV stabilizer groups. The '628 patent describes preparing a homopolymer of the UV stabilizer monomer that can be added to a different polymer.

In order to prevent marring, scratching, degradation from UV light, and other problems that occur at the surface of the coating, surface protecting additives are most effective in that upper layer, e.g., perhaps the upper 0.5 micron of a 50 micron layer of clearcoat, of the coating in a high enough concentration to be effective. The polymer-bound surface protecting additives just discussed are incorporated in a uniform concentration throughout the coating layer to achieve the desired concentration at the surface. As a result, much more of the polymer-bound surface protecting polymer must be included to obtain an effective concentration at the surface.

It would be advantageous, both for performance and cost reasons, to produce a polymeric additive having bound surface protecting groups and a coating composition containing the additive that provides a cured coating layer having a higher concentration of the surface protecting additive at the surface of the coating relative to the rest of the coating thickness.

SUMMARY OF THE INVENTION

The present invention provides a curable coating composition having a resin component that includes a film-forming polymer, a polymeric additive having bound surface protecting groups/and a crosslinker that is reactive with the film-forming polymer. During curing of the applied coating composition on a substrate, the polymeric additive having bound surface protecting groups migrates toward the surface of the coating layer being formed. In the cured coating, the concentration of the polymeric additive having bound surface protecting groups is higher in the surface layer than its concentration in the rest of the film thickness. In particular, the concentration of the polymer-bound surface protecting additive in the upper, up to about 50% of the coating layer thickness is at least about 10% higher relative to its concentration in the rest of the coating.

In a preferred embodiment, the polymeric additive having bound surface protecting groups is an acrylic polymer. The acrylic polymer, at least before the coating composition is being cured, should have no group that is reactive toward the crosslinker, and more preferably the acrylic polymer having the bound surface protecting groups has a group that, during curing of the coating and preferably after the polymeric additive has moved toward the surface of the curing coating layer, is converted to a functionality that is reactive toward the crosslinker. Thus, the acrylic polymeric additive has monomeric units bearing the surface protecting groups and; optionally, monomeric units that are not reactive with the crosslinker but that can be converted during cure to functionality reactive with the crosslinker. The remainder of the monomeric units of the acrylic polymeric additive are free of crosslinkable groups and of groups with active hydrogens, and the remainder of the monomeric units are derived from vinyl monomers with aryl groups or alkyl groups that on average have at least about 4 carbon atoms. The vinyl monomers may optionally contain fluorine or silicon atoms.

The invention further provides an article having a substrate upon which substrate is a cured coating derived from a coating composition according to the invention and a method of producing such a coating on a substrate.

DETAILED DESCRIPTION

The present invention provides a curable coating composition-having a resin component that includes a film-forming polymer, a polymeric additive having bound surface protecting groups, and a crosslinker that is reactive with the film-forming polymer. During curing of an applied coating layer, the polymeric. additive having bound surface protecting groups is designed-to migrate toward the surface of the coating layer being formed. To allow the polymeric additive to migrate toward the surface of the coating layer during curing, the polymeric additive is substantially free from active hydrogen groups, other than those that might be part of the bound surface protecting groups. In addition, the polymeric additive has substantial aliphatic character, preferably in the form of pendant fatty groups having, on average, four or more carbon atoms and preferably having, on average, eight or more carbon atoms. The polymeric additive may also include fluorine or silicon atoms. In the cured coating, the concentration of the polymeric additive having bound surface protecting groups is higher in the surface layer than its concentration in the rest of the film thickness. In particular, the concentration of the polymer-bound surface protecting additive in the upper, up to about 50% of the coating layer thickness is at least about 10% higher relative to its concentration in the rest of the coating.

The weight average molecular weight of the polymeric additive is preferably at least about 7000, more preferably from about 7000 to about 5 100,000, and even more preferably from about 10,000 to about 50,000. In a preferred embodiment, the polymeric additive having bound surface protecting groups is an acrylic polymer.

The polymeric additive having bound surface protecting groups, at least before the coating composition is being cured, should have no group that is reactive toward the crosslinker. In one aspect of the invention, the polymeric additive can, during curing of the coating and preferably after the polymeric additive has moved toward the surface of the curing coating layer, have a group that is converted to a functionality that is reactive toward the crosslinker. The group becomes reactive toward the crosslinker can be converted by degradation under the curing conditions, for example by oxidation or hydrolysis (e.g., of an anhydride group) or by reaction with a further compound. If there-is reaction with a further compound, it is advantageous for the further compound to have a fatty. character so that it tends to migrate to the surface of the coating layer, also. Examples of materials with fatty character are fatty acids and fatty alcohols. In one aspect, the present invention provides a coating composition that includes a polymeric additive having bound surface protecting groups and further having oxirane functionality and a fatty acid component. The fatty acid preferably has 4 or more carbon atoms, more preferably 6 or more carbon atoms, and even more preferably 8 or more carbon atoms. Illustrative examples include, without limitation, butyric acid, pentanoic acid, hexanoic acid, heptanoic acid, octanoic acid, nonanoic acid, decanoic acid, dodecanoic acid, lauroyl acid, stearic acid, linseed oil fatty acid, lineoleic acid, oleic acid, dimer fatty acid, and combinations of these.

In the preferred embodiment when the polymeric additive is an acrylic polymeric additive, it has monomeric units bearing the surface protecting groups and, optionally, monomeric units bearing a group that can be converted during cure to functionality reactive with the crosslinker. The remainder of the monomeric units of the acrylic polymeric additive are free of crosslinkable groups and of groups with active hydrogens, and the remainder of the monomeric units are derived from vinyl comonomers with aryl groups or alkyl groups that on average have at least about 4 carbon atoms. More preferably, the alkyl groups on average have at least about 8 carbon atoms. The vinyl comonomers may alternatively or additionally include fluorine or silicon atoms.

It is preferred for the polymeric additive to have no groups that react during crosslinking of the coating film so that its migration to the surface of the coating layer is not impeded. When the polymeric additive is not crosslinked into the film, the polymeric additive preferably has a sufficiently high molecular weight so that it does not evaporate or is otherwise removed from the cured coating, at least not to a degree that would result in significantly diminished protection.

The polymeric additive has one or more covalently bound surface protecting groups, which may be the same or different. Examples of surface protecting groups include, without limitation, hindered amine light stabilizer groups such as piperidines and oxanalides, ultraviolet light absorbing groups such as benzotriazoles, triazines, and hindered phenols, antioxidant groups such as phenols, phosphites, hindered amines, and hydrazides, and groups to provide anti-marring or slip properties, such as siloxanes and polyfluoro groups.

The polymeric additive having bound surface protecting groups has a lower polarity relative to the film-forming polymer such that, during the cure of the coating layer, the polymeric additive migrates to produce a concentration differential so that the concentration of the polymer-bound surface protecting additive in the upper up to about 50% of the coating layer thickness is at least about 10% higher relative to its concentration in the rest of the coating. In a very preferred embodiment, the concentration of the polymeric additive in the upper from about 1 percent to about 20 percent of the coating thickness is from about 10% to about 1000% higher relative to its concentration in the rest of the coating layer thickness.

The coating composition also includes a film-forming polymer or resin.

The film-forming polymer or resin has a plurality of groups that react with the crosslinker during the curing reaction to form a cured coating layer. The film-forming polymer may be any of the kinds of polymers that are useful in thermosetting coatings compositions. The term "film-forming polymer" is used herein to include polymers, oligomers, and other resins that are reactive toward the crosslinker. In general, the film-forming polymer or resin may be any of the kinds of polymers or resins known to be useful in thermoset coating compositions, including, without limitation, acrylic polymers, including those that are modified by reaction of hydroxyl groups with epsilon-caprolactone; polyesters, including those based on lactones such as polycaprolactone or polyethers such as. polyethylene oxide; alkyds; polyurethanes, including those prepared using polyester polyols; polyurethane- or polyester-modified acrylic polymers, vinyl polymers, epoxy resins, polycarbonates, and so on. For automotive topcoat coating compositions (including basecoat and clearcoat coating compositions, acrylic resins, polyester resins, polyurethane resins, and polyester-polyurethane copolymers are preferred.

Examples of suitable functionalities of the film-forming polymers include, without limitation, hydroxyl groups, acid groups, epoxide groups, carbamate groups, urea groups, isocyanate groups, silanol groups, cyclic carbonate groups, and combinations of these.

In a preferred embodiment, the film-forming polymer has active hydrogen-containing functional groups. Suitable active hydrogen-containing functional groups include, without limitation, hydroxyl functionality, acid functionality, carbamate functionality, urea functionality, and combinations of these. Preferred among these are hydroxyl functionality and carbamate functionality. The film-forming polymer or resin preferably has, on average, at least two reactive hydrogen-containing functional group per molecule, although, depending upon the type of polymer,, the average number of functional groups per molecule may be much higher. The optimum equivalent weight of the film-forming polymer or resin in a particular case may depend on the type of polymer, on the particular crosslinker employed, on the desired crosslink density of the cured coating, and other considerations that would be known to those in the coatings field.

The coating composition further includes a crosslinker or curing agent reactive with the film-forming polymer and may also be reactive with the polymer-bound surface protecting additive. Useful crosslinkers include, without limitation materials having active methylol or methylalkoxy groups, such as aminoplast crosslinking agents or phenol/formaldehyde adducts; curing agents that have isocyanate groups, particularly blocked isocyanate curing agents, curing agents that have epoxide groups, amine groups, acid groups, siloxane groups, cyclic carbonate groups, and anhydride groups; and mixtures thereof. Examples of preferred curing agent compounds include, without limitation, melamine formaldehyde resin (including monomeric or polymeric melamine resin and partially or fully alkylated melamine resin), blocked or unblocked polyisocyanates (e.g., toluene diisocyanate, MDI, isophorone diisocyanate, hexamethylene diisocyanate, and isocyanurates of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Another suitable crosslinking agent is tris(alkoxy carbonylamino) triazine (available from Cytec Industries under the tradename TACT). The curing agent may be combinations of these, particularly combinations that include aminoplast crosslinking agents. Aminoplast resins such as melamine formaldehyde resins or urea formaldehyde resins are especially preferred. Combinations of tris(alkoxy carbonylamino) triazine with a melamine formaldehyde resin and/or a blocked isocyanate curing agent are likewise suitable and desirable.

The coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonyinaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with-an amine. Other catalysts that may be useful in the composition of the invention include Lewis acids, zinc salts, and tin salts.

The polymeric additive may include a group that, after the polymeric additive has migrated to the surface layer of the coating composition, may be reacted or derivatized to form a group reactive with the crosslinking agent. In a preferred embodiment, the polymeric additive has oxirane functionality and the coating composition further includes a fatty acid that migrates to the coating surface along with the coating composition. The acid group of the fatty acid reacts with the oxirane functionality of the polymeric additive to form hydroxyl functionality. The coating composition includes a crosslinking agent that is reactive toward active hydrogen functionality, such as a hydrogen of a carbamate group or a hydroxyl group. Suitable examples of such crosslinking agents include, without limitation, aminoplast resins, isocyanate or blocked isocyanate crosslinkers, A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In-another preferred embodiment, the solvent is water or a mixture of water with small amounts of co-solvents.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Additional agents, for example fillers, stabilizers, wetting agents, dispersing agents, adhesion promoters, etc. may be incorporated into the coating composition. While such additives are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523) or a DOI (ASTM E430) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented-basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures-will vary depending on-the particular blocking groups used in the cross-linking agents, however they generally range between 90° C. and 180° C. The first compounds according to-the present invention are preferably reactive even at relatively low cure temperatures. Thus, in a preferred embodiment, the cure temperature is preferably between 115° C. and 150° C., and more preferably at temperatures between 11 5° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples. The examples are merely illustrative and do not in any way limit the scope of the invention as described and claimed. All parts are parts by weight unless otherwise noted.

EXAMPLES

Example 1

A three-neck, round-bottom, two-liter flask was charged with 170.3 grams of amyl acetate and 170.3 grams of ethyl-3-ethoxy propionate. The flask was fitted with a thermocouple, a slow stream of nitrogen, an agitator, an add line, and a Claissen condenser. The contents of the flask were heated to 110° C. with stirring. A mixture of 272.7 grams 2-ethylhexyl acrylate, 253 grams glycidyl methacrylate, 131.4 grams CGL-550X (available from Ciba-Geigy Corp.), 23.3 grams of amyl acetate, and 6.5 grams of Vazo® 67 (available from DuPont de Nemours) was added to the flask at a steady rate over a period of three hours A portion of 41.9 grams of Shell Cyclo Sol® 53 Solvent (available from Shell Chemicals) and then 11.2 grams of ethyl-3-ethoxy propionate were added to the flask. The temperature of 110° C. was maintained for an additional 30 minutes, after which the polymer product was cooled.

Example 2

A three-neck, round-bottom, two-liter flask was charged with 170.3 grams of amyl acetate and 170.3 grams of ethyl-3-ethoxy propionate. The flask was fitted with a thermocouple, a slow stream of nitrogen, an agitator, an add line, and a Claissen condenser. The contents of the flask were heated to 110° C. with stirring. A mixture of 272.7 grams 2-ethylhexyl acrylate, 253 grams glycidyl methacrylate, 131.4 grams CGL-104 (available from Ciba-Geigy Corp.), 23.3 grams of amyl acetate, and 6.5 grams of Vazo® 67 (available from DuPont de Nemours) was added to the flask at a steady rate over a period of three hours. A mixture of 2.0 grams of VAZO® 67 and 41.9 grams of Shell Cyclo Sol® 53 Solvent was added over 30 minutes. Then, 11.2 grams of ethyl-3-ethoxy propionate were added to the flask. The temperature of 110° C. was maintained for an additional 30 minutes, after which the polymer product was cooled.

Example 3

A three-neck, round-bottom, two-liter flask was charged with 170.3 grams of amyl acetate and 170.3 grams of ethyl-3-ethoxy propionate. The flask was fitted with a thermocouple, a slow stream of nitrogen, an agitator, an add line, and a Claissen condenser. The contents of the flask were heated to 110° C. with stirring. A mixture of 371.2 grams 2-ethylhexyl acrylate, 253 grams glycidyl methacrylate, 32.9 grams CGL-550X (available from Ciba-Geigy Corp.), 23.3 grams of amyl acetate, and 6.5 grams of Vazo® 67 (available from DuPont de Nemours) was added to-the flask at a steady rate over a period of three hours. A portion of 41.9 grams of Shell Cyclo So® 53 Solvent and-then 11.2 grams of ethyl-3-ethoxypropionate were added to the flask. The temperature of 110° C. was maintained for an additional 30 minutes, after which the polymer product was cooled.

Example 4

A three-neck, round-bottom, two-liter flask was charged with 170.3 grams of amyl acetate and 170.3 grams of ethyl-3-ethoxy propionate. The flask was fitted with a thermocouple, a slow stream of nitrogen, an agitator, an add line, and a Claissen condenser. The contents of the flask were heated to 110° C. with stirring. A mixture of 371.2 grams 2-ethylhexyl acrylate, 253 grams glycidyl methacrylate, 32.9 grams CGL-104 (available from Ciba-Geigy Corp.), 23.3 grams of amyl acetate, and 6.5 grams of Vazo® 67 (available from DuPont de Nemours) was added to the flask at a steady rate over a period of three hours. A mixture of 2.0 grams of VAZO® 67 and 41.9 grams of Shell Cyclo Sol® 53 Solvent was added over 30 minutes. Then, 11.2 grams of ethyl-3-ethoxy propionate were added to the flask. The temperature of 110° C. was maintained for an additional 30 minutes, after which the polymer product was cooled.

Example 5

A three-neck, round-bottom, three liter flask equipped with thermocouple, a slow stream of nitrogen, agitator packed fractionation column, liquid/liquid extractor, and condenser was charged with a mixture of 324.5 grams of methyl carbamate, 0.9 gram of dibutyl tin oxide, 19.2 grams of methanol, and 342.5 grams of Aromatic 100. The contents of the flask was heated to 140° C. A monomer mixture of 475.8 grams of hydroxyethyl methacrylate, 218.4 grams of styrene, 198 grams of 2-ethylhexyl methacrylate, 407.6 grams of 2-ethylhexyl. acrylate, 28.4 grams of NORBLOC 7966 (a polymerizable, ethylenically unsaturated benzotriazole UV absorber monomer available from Noramco Inc.), and 117 grams of VAZO® 67 was then added at a steady rate over a period of three-hours. After the monomer addition was complete, the contents of the flask were cooled to 120° C. and then a mixture of 2.78 grams of dibutyl tin oxide and 534 grams of toluene was added. The temperature was increased to 130° C. and refluxed through the column to remove the methanol, a by-product of the reaction, through liquid/liquid extraction. After two hours, a mixture of 2.78 grams of dibutyl tin oxide and 22 grams of toluene was added. After an additional two hours, a mixture of 2.78 grams of dibutyl tin oxide and 22 grams of toluene was added. When 90% of the hydroxyl functionality had reacted, as determined by titration, the contents of the flask was cooled to 115° C. and the extractor, column and condenser were removed from the flask. Vacuum was applied to remove volatile components. Finally, 522 grams of amyl acetate was added.

Comparative Example A

A three-neck, round-bottom, two-liter flask was charged with 170.3 grams of amyl acetate and 170.3 grams of ethyl-3-ethoxy propionate. The flask was fitted with a thermocouple, a slow stream of nitrogen, an agitator, an add line, and a Claissen condenser. The contents of the flask were heated to 110° C. with stirring. A mixture of 404.1 grams 2-ethylhexyl acrylate, 253 grams glycidyl methacrylate, 23.3 grams of amyl acetate, and 6.5 grams of Vazo® 67 (available from DuPont de Nemours) was added to the flask at a steady rate over a period of three hours. A portion of 41.9 grams of Shell Cyclo Sol® 53 Solvent and then 11.2 grams of ethyl-3-ethoxy propionate were added to the flask. The temperature of 110° C. was maintained for an additional 30 minutes, after which the polymer product was cooled.

Examples 6–9 and Comparative Example B
Clearcoat Compositions

Clearcoat compositions were prepared by combining 302.4 grams of a carbamate-functional acrylic (69.5% nonvolatile by weight in amyl acetate, equivalent weight 425), 69.9 grams of a carbamate-functional compound (30.55% nonvolatile by weight in a mixture of oxygenated solvents, equivalent weight 379), 42.7 grams of Resimene 747 (available from Solution, Inc.), 40 grams of a 14% solution of Tinuvin 928 (available from Ciba Specialty Chemicals), 3.2 grams of an 85% solution of Tinuvin 400 (available from Ciba Specialty Chemicals), 3.9 grams of Tinuvin 123 (available from Ciba Specialty Chemicals), 1.2 grams of an additive package, 12 grams of a sulfonic acid-type catalyst solution, 15.2 grams fumed silica, 5.8 grams of the resin of the Example 1–4 or the Comparative Example A, 1.6 grams of octanoic acid, and 66 grams of solvent.

| Clearcoat Example: | Example 6 | Example 7 | Example 8 | Example 9 | Comparative Example B |
|---|---|---|---|---|---|
| Resin | Example 1 | Example 2 | Example 3 | Example 4 | Comparative Example A |
| % TINUVIN 928 on nonvolatile vehicle | 2.2 | 2.0 | 2.2 | 2.1 | 2.2 |
| % TINUVIN 400 on nonvolatile vehicle | 0.85 | 0.85 | 0.85 | 0.85 | 0.85 |
| % TINUVIN 123 on nonvolatile vehicle | 1.28 | 1.5 | 1.45 | 1.5 | 1.5 |

-continued

| Clearcoat Example: | Example 6 | Example 7 | Example 8 | Example 9 | Comparative Example B |
|---|---|---|---|---|---|
| Resin | Example 1 | Example 2 | Example 3 | Example 4 | Comparative Example A |
| 4500 hours QUV exposure, % gloss retention (20° gloss) | 82 | 95 | 81 | 89 | 76 |
| 4500 hours QUV exposure, (Amount of distortion of clearcoat surface) | none | none | none | none | sl. cracking |
| 4500 hours WOM exposure, % gloss retention (20° gloss) | 91 | 98 | 91 | 95 | 85 |
| 4500 hours WOM exposure, (Amount of distortion of clearcoat surface) | none | none | none | none | sl. cracking |

The results of the accelerated exposure testing (QUV and WOM testing) demonstrate that the compositions of the invention provide better durability.

The invention has been described in detail with reference to preferred embodiments thereof. It should be understood, however, that variations and modifications can be made within the spirit and scope of the invention.

What is claimed is:

1. A curable coating composition, comprising a film-forming polymer, a polymeric additive having at least one bound surface protecting group, and a crosslinker that is reactive with the film-forming polymer, wherein the reactivity of said polymeric additive toward other components in the coating composition is such that during curing the polymeric additive, has a concentration in the upper about 50% of the cured coating layer thickness that is at least about 10% higher than in the rest of the cured coating layer and further wherein said polymeric additive comprises comonomer units having groups selected from the group consisting of aryl groups, alkyl groups having, on average, four or more carbon atoms, and combinations thereof.

2. A curable coating composition according to claim 1, wherein said comonomer units comprise at least one atom selected form the group consisting of fluorine, silicon, and combinations thereof.

3. A curable coating composition according to claim 1, wherein said polymeric additive has a weight average molecular weight of at least about 7000.

4. A curable coating composition according to claim 1, wherein said polymeric additive has a weight average molecular weight of from about 10,000 to about 50,000.

5. A curable coating composition according to claim 1, wherein said polymeric additive has no functionality that is reactive toward the crosslinker.

6. A curable coating composition according to claim 1, wherein said polymeric additive has first functionality that is reactive under curing conditions with a further component of the coating composition to form a second functionality that is reactive toward the crosslinker.

7. A curable coating composition according to claim 6, wherein said first functionality is oxirane functionality and further wherein said further component is a fatty acid.

8. A curable coating composition according to claim 7, wherein said fatty acid has eight or more carbon atoms.

9. A curable coating composition according to claim 1, wherein said surface protecting group is selected from the group consisting of hindered amine light stabilizer groups, ultraviolet light absorbing groups, antioxidant groups, groups providing slip, and combinations thereof.

10. A curable coating composition according to claim 1, wherein said surface protecting group is selected from piperidine groups, benzotriazole groups, triazine groups, and combinations thereof.

11. A curable coating composition according to claim. 1, wherein said polymeric additive is an acrylic polymer.

12. A curable coating composition according to claim 1, wherein said crosslinker is an aminoplast resin.

13. A curable coating composition according to claim 1, wherein said film-forming polymer is an acrylic polymer having carbamate functionality.

14. A process for preparing. a coated substrate, comprising steps of:
   (a) applying a coating composition to said substrate, said coating composition comprising a film-forming polymer, a polymeric additive having at least one bound surface protecting group, and a crosslinker that is reactive with the film-forming polymer, wherein said polymeric additive is substantially free of groups reactive with the crosslinker and further wherein said polymeric additive comprises comonomer units having groups selected from the group consisting of aryl groups, alkyl groups having, on average, four or more carbon atoms, and combinations thereof and
   (b) curing the coating composition to form a cured coating layer, wherein the concentration of the polymeric additive in the upper about 50% of the cured coating layer thickness is at least about 10% higher than the concentration of the polymeric additive in the rest of the. cured coating layer.

15. A process according to claim 14, wherein said polymeric additive has a weight average molecular weight of at least about 7000.

16. A process according to claim 14, wherein said polymeric additive has no functionality that is reactive toward the crosslinker.

17. A process according to claim 14, wherein said polymeric additive has oxirane functionality and the coating composition further includes a fatty acid having eight or more carbon atoms.

18. A process according to claim 14, wherein said surface protecting group is selected from the group consisting of hindered amine light stabilizer groups, ultraviolet light absorbing groups, antioxidant groups, groups providing slip, and combinations thereof.

19. A process according to claim 14, wherein said surface protecting group is selected from piperidine groups, benzotriazole groups, triazine groups,and combinations thereof.

20. A process according to claim 14, wherein said polymeric additive is an acrylic polymer.

21. A process for preparing a coating substrate, comprising step of:
   (a) applying a coating composition to said substrate, said coating composition comprising a film-forming polymer, a polymeric additive having at least one bound surface protecting group and having oxirane functionality, a fatty acid, and a crosslinker that is reactive with the film-forming polymer, wherein said polymeric additive is substantially free of groups reactive with the crosslinker and further wherein said polymeric additive comprises comonomer units having groups selected from the group consisting of aryl groups, alkyl groups having, on average, four or more carbon atoms, and combinations thereof and
   (b) curing the coating composition to form a cured coating layer, wherein during said curing step the oxirane functionality reacts with the fatty-acid to produce hydroxyl groups that react with the crosslinker, wherein the concentration of the polymeric additive in the upper about 50% of the cured coating layer thickness is at least about 10% higher than the concentration of the polymeric additive in the rest of the cured coating layer.

22. A process according to claim 21, wherein said polymeric additive has a weight average molecular weight of at least about 7000.

23. A process according to claim 21, wherein said polymeric additive has no functionality that is reactive toward the crosslinker.

24. A process according to claim 21, wherein said fatty acid has eight or more carbon atoms.

25. A process according to claim 21, wherein said surface protecting group is selected from the group consisting of hindered amine light stabilizer groups, ultraviolet light absorbing groups, antioxidant groups, groups providing slip, and combinations thereof.

26. A process according to claim 21, wherein said surface protecting group is selected from piperidine groups, benzotriazole groups, triazine groups, and combinations thereof.

27. A process according to claim 21, wherein said polymeric additive is an acrylic polymer.

* * * * *